No. 653,120. Patented July 3, 1900.
A. H. REID.
PASTEURIZING APPARATUS.
(Application filed Dec. 14, 1899.)
(No Model.) 2 Sheets—Sheet 2.

Witnesses: Inventor:

United States Patent Office.

ALBAN H. REID, OF PHILADELPHIA, PENNSYLVANIA.

PASTEURIZING APPARATUS.

SPECIFICATION forming part of Letters Patent No. 653,120, dated July 3, 1900.

Application filed December 14, 1899. Serial No. 740,263. (No model.)

*To all whom it may concern:*

Be it known that I, ALBAN H. REID, of Philadelphia, county of Philadelphia, and State of Pennsylvania, have invented a new and useful Improvement in Pasteurizing Apparatus, of which the following is a specification.

This invention relates to a heater for pasteurizing milk, &c., and has reference more particularly to that class of pasteurizers for treating milk in large quantities in dairies, the apparatus embodying a heating vessel for the milk and a surrounding chamber for the introduction of the heating medium.

The invention consists of various improvements in apparatus of this character, which will be fully described in the specification and pointed out in the claims.

Figure 1:
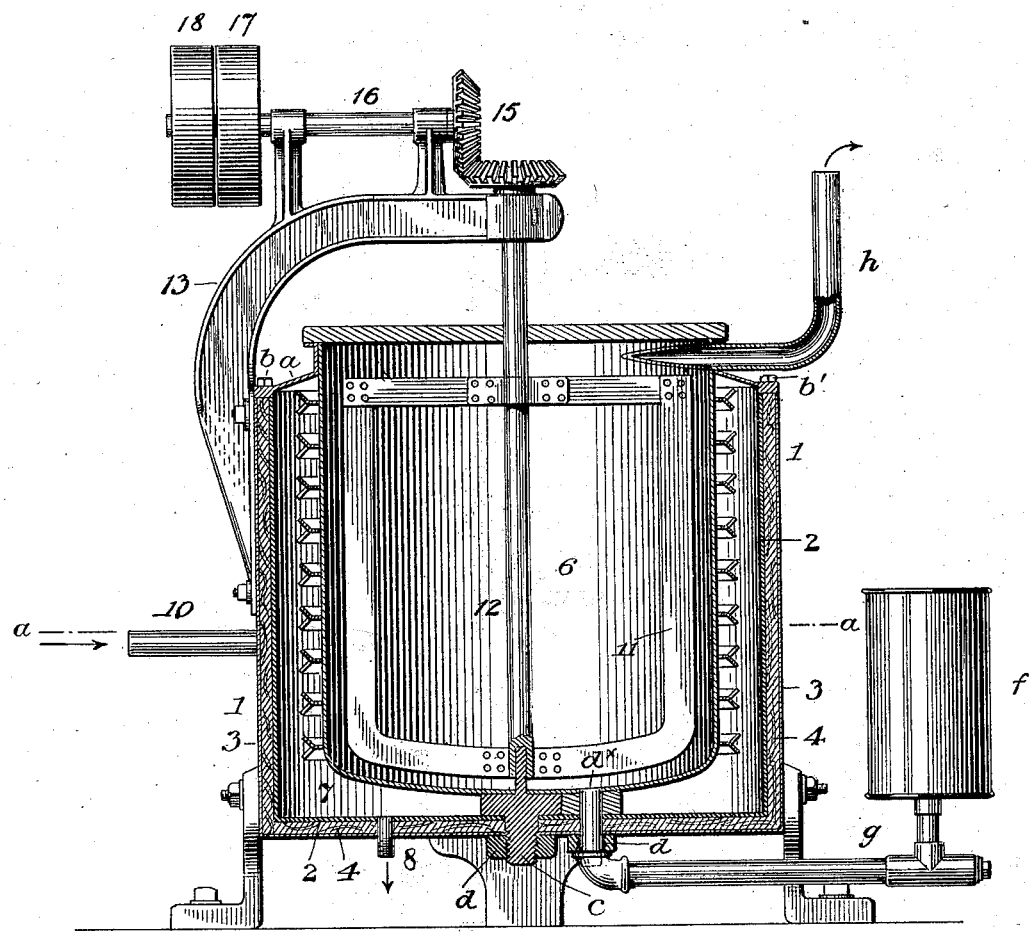
Figure 2:
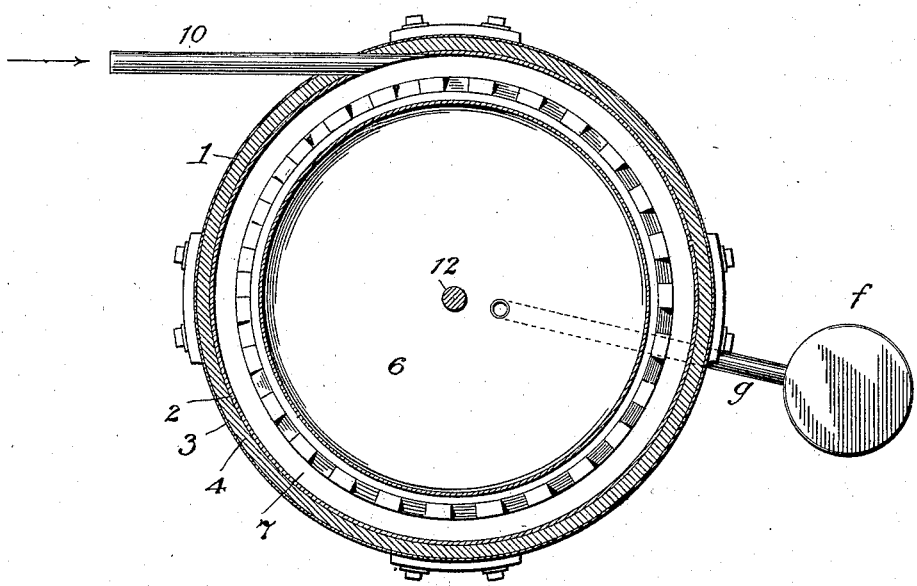
Figure 3:
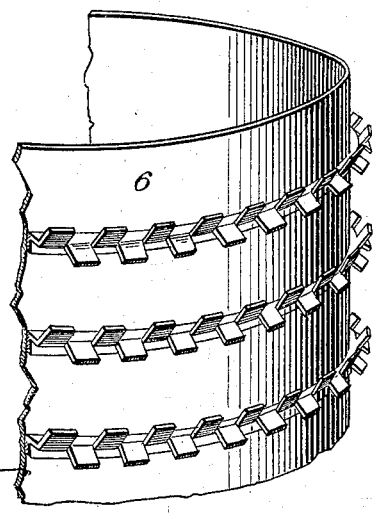

In the accompanying drawings, Figure 1 is a vertical sectional elevation of my improved apparatus. Fig. 2 is a horizontal sectional elevation on the line $a\,a$ of the preceding figure. Fig. 3 is an enlarged view of a portion of the heating vessel, showing the heat-radiating projections thereon.

Referring to the drawings, 1 represents an outer cylindrical casing sustained by suitable legs and formed, preferably, of an inner galvanized-iron facing 2, an outer tin facing 3, and an intermediate filling of wood 4 between the two facings to retain the heat. This casing has its upper end open and receives a heating vessel 6 for the milk, which extends within the outer casing and is seated removably therein, as will be more fully described hereinafter, leaving an annular surrounding space 7 for the introduction of the heating medium. The heating vessel is preferably of copper strengthened by a series of projecting ribs extending around the vessel at intervals from top to bottom and firmly secured thereto, leaving between them free unobstructed spaces surrounding the vessel. These ribs are in the form of metal strips firmly secured at their inner edges to the vessel and having their outer edges slit at intervals to form lips, which are bent alternately upward and downward, as clearly shown in Fig. 3. These lips form an extended radiating surface, which will rapidly absorb the heat from the steam, and the downwardly-extending lips will act to draw off the condensed water and will direct the same downward to the bottom of the outer casing, where the water will find an exit through a drip-opening 8 therein. At its upper end the heating vessel has fixed to it a downwardly and outwardly extending flange $a$, adapted at its outer edge to rest upon the upper edge of the casing, to which it is securely attached by fastening-screws $b$ and $b'$, &c. At its lower end at the center the heating vessel has a depending threaded neck $c$, which extends through the bottom of the casing and is secured by a nut $d$ applied thereto. To one side of the center the heating vessel has fixed to it a depending pipe $d^\times$, threaded exteriorly and communicating with the interior of the vessel. This pipe is adapted when the vessel is set in place in the casing to extend through an opening in its bottom, to which it is firmly secured by a nut $d$. The milk to be heated is introduced through this pipe from a tank $f$ by means of a connecting-pipe $g$. At its upper end the heating vessel is further provided with a spout $h$, through which the contents of the vessel may be poured after being heated sufficiently.

I prefer to employ steam as the heating medium and propose to introduce the same from any suitable source tangentially into the side of the casing, as shown in Fig. 2, a pipe 10 entering the casing tangentially being provided for this purpose. By the introduction of steam in this manner its entrance is in line with the interior curved surface of the casing and its passage is therefore unobstructed, and consequently a free whirling motion is obtained and it will circulate freely around the heating vessel within the surrounding space, so that the heating vessel will be subjected at every point to the action of the heating medium. In its passage around the vessel the heat from the steam will be rapidly absorbed by the projecting lips on the heating vessel and the steam will be condensed, the downwardly-inclined lips directing the water to the bottom of the casing and keeping the surface of the vessel free of the same.

In order to prevent the contents of the heating vessel from burning or scorching, I propose to employ a beater or agitator 11, carried on a vertical shaft 12, mounted in a bearing in an overhanging arm 13, fixed to the side of the casing. The upper end of this shaft is provided with a bevel-pinion driven by a vertical bevel-gear 15, mounted on a horizontal shaft 16, having on its ends fast and loose pulleys 17 and 18, adapted to be driven from any suitable source.

While I have described steam as the heating medium which I prefer to employ, it will be understood that the invention is not to be limited to the use of steam, but contemplates as well the use of hot air, &c.

I am aware that it has been proposed to construct a pasteurizing apparatus comprising an outer casing and an inner rotary heating vessel driven by a fluid under pressure introduced tangentially into the casing and impinging on wings or abutments projecting from the rotary vessel. My apparatus differs from this in that the heating vessel is fixed and there is no obstruction to the introduction of the heating medium, which has a free circular path around the heating vessel throughout its length. This is not true where a fluid under pressure rotates the vessel, for the reason that the wings or abutments obstruct and interfere with the free and proper circulation of the heating medium.

I am also aware that it has been proposed to introduce steam under pressure between two cylindrical vessels in the direction of their radii. In this case the steam will not have a whirling motion around the heating vessel, but will divide in two streams and flow in opposite directions and, meeting each other, will effectually prevent a continuous flow around the same.

I believe myself to be the first to produce a pasteurizing apparatus comprising an outer cylindrical casing and an inner cylindrical heating vessel fixed therein and relatively immovable with ribs surrounding it and to introduce into the intermediate surrounding space tangentially a heating medium under pressure.

Having thus described my invention, what I claim is—

1. In a pasteurizing apparatus the combination with an outer casing, of a non-rotary heating vessel fixed therein and leaving an intermediate unobstructed surrounding space, a series of ribs fixed to and surrounding the heating vessel at intervals with unobstructed spaces between them, and means for freely introducing steam under pressure tangentially into the surrounding space through an unobstructed opening in the side of the casing; whereby the steam will be free to traverse the spaces between the ribs with a whirling action, and whereby the ribs will serve the double function of absorbing the heat and collecting the water of condensation.

2. In a pasteurizing apparatus the combination of an outer casing, a non-rotary heating vessel fixed therein with a surrounding space between them, a series of metal strips secured at their inner edges to the heating vessel and extending around the same horizontally with unobstructed spaces between them, said ribs having their outer edges incised at intervals and the intermediate lips bent alternately upward and downward, and means for introducing steam under pressure into the surrounding space; whereby the upwardly and downwardly bent lips will offer extended surfaces for the absorption of heat, and whereby the downwardly-extended lips will direct the water of condensation downward and maintain the surface of the heating vessel free from the same.

In testimony whereof I hereunto set my hand, this 10th day of November, 1899, in the presence of two attesting witnesses.

ALBAN H. REID.

Witnesses:
FRANK H. BERHAM, Jr.,
MARTIN STOTZ.